United States Patent [19]
Deville

[11] Patent Number: 5,520,206
[45] Date of Patent: May 28, 1996

[54] EXHAUST REDUCTION SYSTEM FOR CONTROL VALVES

[76] Inventor: Wayne E. Deville, 220 Estate Dr., Pineville, La. 71360

[21] Appl. No.: 269,356

[22] Filed: Jun. 30, 1994

[51] Int. Cl.⁶ .......................... F16K 31/12; F15B 13/042
[52] U.S. Cl. ...................... 137/12; 137/14; 137/487; 137/488; 137/492; 137/505.12; 251/26; 251/28
[58] Field of Search .................... 251/25, 26, 28, 251/29, 1; 137/14, 485, 488, 492, 492.5, 505.12, 12, 487, 500, 503, 497

[56] References Cited

U.S. PATENT DOCUMENTS

| | | | |
|---|---|---|---|
| 985,175 | 2/1911 | Hirst | 251/26 |
| 1,731,519 | 10/1929 | Bastian | 137/505.12 |
| 1,957,972 | 5/1934 | Mills | 137/505.12 |
| 1,959,105 | 5/1934 | McCarthy | 251/26 |
| 1,991,663 | 2/1935 | Delaney | 251/26 |
| 2,306,060 | 12/1942 | Jacobsson | 137/505.12 |
| 2,638,920 | 5/1953 | Woodhull | 137/492 |
| 2,707,970 | 5/1955 | Hughes | 137/505.12 |
| 3,004,548 | 10/1961 | Janes | 137/505.12 |
| 3,083,721 | 4/1963 | Matthews et al. | 137/505.12 |
| 3,088,486 | 5/1963 | Salmon et al. | 137/505.12 |
| 3,132,485 | 5/1964 | Watson | 137/505.12 |
| 3,890,992 | 6/1975 | Wolz | 137/14 |
| 3,977,423 | 8/1976 | Clayton | 137/12 |
| 5,047,965 | 9/1991 | Zlokovitz | 137/487 |
| 5,063,956 | 11/1991 | Borcuch et al. | 137/14 |
| 5,097,858 | 3/1992 | Zlokovitz et al. | 137/14 |
| 5,460,196 | 10/1995 | Yonnet | 137/12 |

FOREIGN PATENT DOCUMENTS

| | | | |
|---|---|---|---|
| 925982 | 5/1960 | United Kingdom | 137/505.12 |

*Primary Examiner*—George L. Walton
*Attorney, Agent, or Firm*—John M. Harrison

[57] ABSTRACT

An exhaust reduction system for reducing gas emissions in pipeline controlling devices which operate control valves, which system adjusts and reduces the pressure of a control stream of gas from a conventional line pressure regulator to the control valves. In a preferred embodiment the exhaust reduction system operates in cooperation with the conventional line pressure regulator which reduces the pressure of the gas from the pipeline to a selected system pressure and includes a system high pressure regulator, a system low pressure regulator and in some cases, a selector relay, for further reducing the pressure of the incoming gas and channeling the gas at reduced pressure to at least one controller. The gas flow from a single controller (and from multiple controllers which is at the highest or lowest pressure as determined by the high or low discriminating pressure selector relay) is channeled to a gas pressure multiplier, where the gas pressure of a second volume of gas is increased in a selected ratio and introduced into the control valve at a selected low pressure for regulating the gas pressure in the pipeline. Accordingly, the control valve can be easily operated to regulate the pressure in the pipeline by manipulating adjusting knobs located in the system high pressure regulator and the system low pressure regulator and controlling the pressure of the control gas stream to the control valve with minimum gas control stream loss.

18 Claims, 1 Drawing Sheet

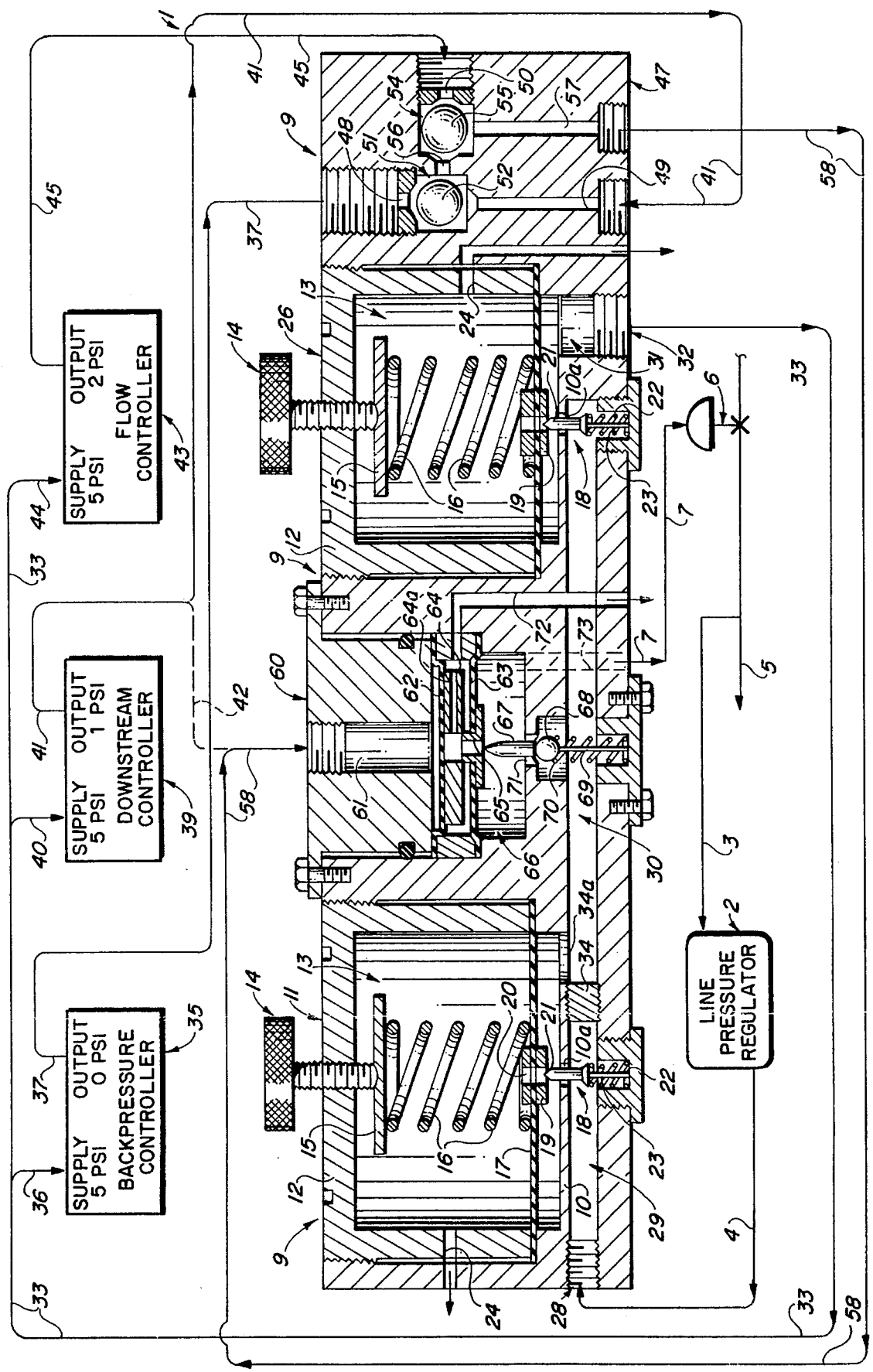

EXHAUST REDUCTION SYSTEM FOR CONTROL VALVES

BACKGROUND OF THE INVENTION

Field of the Invention

This invention relates to systems for controlling the flow of gas in pipelines and more particularly, to an exhaust reduction system for controlling devices, which system is designed to reduce the exhaust control gas emissions from the controlling devices in the course of controlling the flow of gas by means of control valves through a pipeline. In a preferred embodiment, the exhaust reduction system of this invention is coupled to a conventional pipeline pressure regulator for receiving a flow of control gas and reducing the gas pressure to a desired system pressure. This control gas stream is introduced into a system high pressure regulator and a system low pressure regulator, where the pressure is further sequentially reduced and adjusted by manipulating adjusting knobs in the system high pressure regulator and system low pressure regulator. The gas stream is then exhausted from the low pressure regulator to at least one gas controlling device such as a back pressure controller, downstream controller and flow controller, where it is exhausted at various pressures, depending upon the number and characteristics of the controllers used. One or more gas streams from the controller or controllers are then introduced directly into one chamber of a gas pressure multiplier (in the case of a single controller) or into separate ports of a high or low discriminating pressure selector relay (in the case of two or more controllers) and, in the latter case, the gas stream having the highest or lowest pressure is exhausted from the selector relay and introduced into one chamber of the gas pressure multiplier. The gas pressure multiplier then increases or multiplies the gas pressure in a second chamber of the gas pressure multiplier in a selected ratio, typically 1 to 3 or 1 to 6 and exhausts the gas at a desired low multiplied pressure, directly to the control valve mechanism of the control valve which operates to regulate the flow of gas through the pipeline.

Accordingly, in a preferred embodiment of the invention gas from the conventional line pressure regulator can be introduced into the system high pressure regulator and the system low pressure regulator as described above and from the system low pressure regulator at a regulated pressure, directly to either a back pressure controller, downstream controller or a flow controller, from which the gas stream is introduced directly into a first chamber of the multiplier and from the second multiplier chamber, into the control valve, as described above.

In another preferred embodiment of the invention the control gas flow from the line pressure regulator can be introduced into the system high pressure regulator and the system low pressure regulator as described above and from the system low pressure regulator at a selected pressure into any two of the three back pressure controller, downstream controller and flow controller and from these flow controllers into a selector relay controller. From the selector relay controller the control gas is routed into a first chamber of the gas pressure multiplier, where the gas stream in a second chamber is multiplied in a selected ratio, typically of from 1 to 3 or 1 to 6, and is subsequently introduced at a selected low pressure into the control valve.

One of the problems inherent in conventional gas systems for operating pipeline control valves is that of excessive exhausting of the controlling device gas itself, typically natural gas, into the atmosphere during the process of operating the pipeline control valves. This excessive use of control valve gas is apparent due to the relatively high control gas pressure (about 20 psi) which is normally used to operate the control valves. For example, the Fisher 4160 control valve system exhausts from about 48 to about 309 mcf per year natural gas into the atmosphere. If natural gas is assumed to have a value for comparison purposes of $2.50 per mcf, the monetary loss range is from $120.00 to $772.50 for each control valve which is served by a Fisher 4160 control device. In contrast, the exhaust reduction system of this invention has been found to exhaust from about 23 to about 106 mcf per year, for a minimal annual saving in gas loss of $62.50 and a maximum gas saving loss of $498.00. Accordingly, the exhaust reduction system of this invention saves from 52% to 63% of the control gas which would be otherwise lost in operating a typical control valve in natural gas pipeline control systems.

Accordingly, it is an object of this invention to provide a new and improved exhaust reduction system for controlling devices that operate control valves, which system minimizes the volume of gas exhausted from the controlling devices during operation of the control valves.

Another object of this invention is to provide an exhaust reduction system for operating controlling devices in natural gas and other gas systems, which system is designed to control the pressure of a control stream of gas to the control valve and minimize the volume of gas exhausted into the atmosphere from the control valves during operation of the control valves.

A still further object of this invention is to provide a natural gas exhaust reduction system for controlling control valves mounted on pipelines and regulating the flow of natural gas through the pipelines, which system is used in association with a conventional pressure regulator that reduces the pressure of a control stream of gas diverted from the pipeline, to a selected entry pressure. The system includes an adjustable high pressure regulator and an adjustable low pressure regulator for further reducing the pressure of the control gas stream from the pressure regulator and introducing the gas at a much reduced and regulated pressure to a gas controller. The gas is channeled from the controller to a first chamber of a gas pressure multiplier and a separate volume of gas is supplied from a second chamber of the gas pressure multiplier at a selected, multiplied, yet low, operating control pressure, into the control valve.

Yet another object of the invention is to provide an exhaust reduction system for controlling control valves which regulate the flow of natural gas or other gas through pipelines, which system is linked to a conventional pressure regulator that reduces the pressure of a control gas stream from the pipeline into a system housing containing a system high pressure regulator, a system low pressure regulator, a selector relay and a gas pressure multiplier. The gas is routed first from the conventional pressure regulator through the system high pressure regulator, where the pressure is reduced by manipulating an adjusting knob to a selected value, after which, it is introduced into the system low pressure regulator for further reduction, in like manner. The control gas is then exhausted from the system low pressure regulator into a back pressure controller, a downstream controller and a flow controller at a constant pressure and is exhausted from these controllers at varying pressures, into the respective ports of the selector relay. The highest gas pressure stream entering the selector relay is allowed to flow from the selector relay and is introduced into a first chamber of the gas pressure multiplier, which multiplies gas in a second multiplier chamber in a selected ratio, typically in the range of from 1:3 to 1:6. The gas in the second chamber is subsequently introduced into the control components of the control valve.

SUMMARY OF THE INVENTION

These and other objects of the invention are provided in a new and improved exhaust reduction system and process for reducing the quantity of exhaust gas emitted from controlling devices for natural gas control valves while regulating the flow of gas through a pipeline, which system includes a pair of pressure regulators for reducing gas pressure received from a conventional pressure-reducing line regulator that receives a stream of control gas from a pipeline controlled by a control valve. The control gas is emitted at reduced pressure from the pressure regulators into at least one of a back pressure controller, downstream controller or flow controller and from that controller or controllers, either directly into a gas pressure multiplier, (in the case of a single controller) or, in the case of more than one controller, into a selector relay for determining the highest pressure stream from the controllers and introduction of that stream into a first chamber of the gas pressure multiplier. A second gas stream entering a second chamber of the gas pressure multiplier from the pressure regulators is multiplied in a ratio of 1:3 and introduced into the control system of the control valve.

BRIEF DESCRIPTION OF THE DRAWING

The invention will be better understood by reference to the accompanying drawing, wherein:

FIG. 1 is a schematic sectional diagram illustrating a preferred embodiment of the exhaust reduction system of this invention.

DESCRIPTION OF THE PREFERRED EMBODIMENTS

Referring to FIG. 1 of the drawing, in a first preferred embodiment of the invention the exhaust reduction system of this invention is generally illustrated by reference numeral 1. The exhaust reduction system 1 is used in connection with a conventional line pressure regulator 2, which receives a control stream of natural gas or other gas from a pipeline 5 by means of an inlet line 3 and reduces the pressure of the gas to a selected output pressure flowing through the line pressure regulator outlet line 4. The pressure of the gas flowing through the line pressure regulator outlet line 4 is typically about 100 psi and is introduced into the gas inlet 28 of a system housing 9, where it flows into a primary gas chamber 29. The high pressure gas chamber 29 communicates with the lower end of the housing chamber 13 of a system high pressure regulator 11, located in the system housing 9. An adjusting knob 14 of the system high pressure regulator 11 is threaded in the system high pressure regulator housing 12 and is adjustable against the tension in the range spring 16, seated on a spring plate 15 in the housing chamber 13, to move the seat assembly cap 19, mounted on a control diaphragm 17, downwardly. This allows the seat assembly valve 21 to contact the seat assembly cap 19 at the cap orifice 20 and force the seat assembly valve 21 from sealing engagement with a plate orifice 10a, provided in the bottom plate 10 of the system housing 9. The seat assembly valve 21 is a component of the seat assembly 18, which includes the seat assembly cap 19, the cap orifice 20 provided in the seat assembly cap 19 and a seat assembly valve spring 22, which is mounted on a spring guide rod 23 to normally bias the bevelled base of the seat assembly valve 21 in the plate orifice 10a of the bottom plate 10 and thus seal the plate orifice 10a from any flow of gas from the primary gas chamber 29. However, when the pressure in the range spring 16 exerted by the spring plate 15 in response to manipulation of the adjusting knob 14, is greater than the bias in the seat assembly valve spring 22, the seat assembly valve 21 is forced downwardly, thereby opening the plate orifice 10a and allowing gas to flow from the primary gas chamber 29 through the plate orifice 10a and the chamber port 34a, into the intermediate gas chamber 30. The control gas supply then flows from the intermediate gas chamber 30 and the system high pressure regulator 11, through the corresponding plate orifice 10a of the bottom plate 10 of a system low pressure regulator 26. As in the case of the system high pressure regulator 11, the pressure of the gas flowing through the plate orifice 10a and the system low pressure regulator 26 is adjusted by manipulating the adjusting knob 14 to control the bias in the range spring 16 of the system low pressure regulator 26, thereby controlling the pressure of the control gas flowing from the low pressure gas chamber 31 into the gas outlet line 33, through the gas outlet port 32. The control gas stream is introduced by means of the gas outlet line 33 into at least one of either the back pressure controller 35, a downstream controller 39 and/or a flow controller 43. The gas is then discharged, either from a single controller, for example, the downstream controller 39, through a bypass line 42, into the multiplier inlet port 61 of a gas pressure multiplier 60, or from multiple controllers, into the selector relay 47, as hereinafter further described. Both the system high pressure regulator 11 and the system low pressure regulator 26 are fitted with an exhaust vent 24 to remove residual gas from the respective housing chambers 13.

The gas pressure multiplier 60 is fitted with a signal diaphragm 62 and a control diaphragm 63, which are sized and designed to facilitate a 1:3 multiplying effect in the gas pressure multiplier 60. For example, gas entering the multiplier inlet port 61 of the gas pressure multiplier 60 from the bypass line 42 at a pressure of 1 psi on the signal diaphragm 62 will cause an increase in gas pressure of 3 psi below the control diaphragm 63 at the multiplier exhaust 72. Similarly, gas entering the multiplier inlet port 61 at 2 psi will cause a pressure of 6 psi in the control gas supply at the multiplier exhaust 72. The gas pressure multiplier 60 includes a ring spacer 64, mounted between the signal diaphragm 62 and the control diaphragm 63 and a spacer port 65 is provided in a ring spacer 64, which accommodates gas flowing through the pintle port 71 into the multiplier chamber 66 from the intermediate gas chamber 30 when the pintle 67 engages the spacer port 65, as illustrated in the drawing and as hereinafter described. The pintle 67 is further fitted with a pintle ball 68, mounted on a pintle ball guide rod 69 which is encompassed by a pintle spring 70, which pintle ball 68 facilitates selective closing of the pintle port 71 by engagement of the pintle ball 68 responsive to the bias in the pintle spring 70. Accordingly, the gas pressure multiplier 60 operates as follows: Gas from the downstream controller 39 enters the multiplier inlet port 61 from the bypass line 42 (illustrated in phantom) at a specified pressure and applies that pressure to the signal diaphragm 62. This pressure forces the signal diaphragm 62 and control diaphragm downwardly and after the pintle 67 is displaced downwardly by contact with the spacer port 65 and the pintle ball 68 unseats from the pintle port 71, the pressure in the signal diaphragm 62 is balanced by the pressure on the control diaphragm 63 by gas pressure which is throttled into the multiplier chamber 66 through the pintle port 71 from the intermediate gas chamber 30. Depending upon which gas pressure is higher, that is, the gas pressure in the multiplier chamber 66 and that of the multiplier inlet port 61, the pintle 67 operates upwardly or downwardly to alternately open and seal the pintle port 71 by means of the pintle ball 68 and allows gas to flow from the multiplier chamber 66 beneath the control diaphragm 63 and through the multiplier control vent 73. Gas trapped in the chamber between the signal diaphragm 62 and control diaphragm 63 exhausts through the ring spacer port 64a, which communicates with a multiplier exhaust 72. The control gas in the multiplier chamber 66 is typically under three times the pressure of the gas entering the multiplier inlet port 61 and flows into a control valve signal line 7 and the control element of a control valve 6, to operate the control valve 6 and regulate the gas flowing through the pipeline 5.

Referring again to FIG. 1 of the drawing, at least two, or possibly three controllers, that is, typically a back pressure controller 35, a downstream controller 39 and a flow controller 43, are normally used in cooperation with the control valve 6 to control the flow of gas to the pipeline 5. The gas which is exhausted from the low pressure gas chamber 31 of the system low pressure regulator 26 is channeled by means of the gas outlet line 33 to a back pressure gas inlet line 36, a downstream gas inlet line 40 and a flow inlet gas line 44, to introduce gas into the back pressure controller 35, downstream controller 39 and flow controller 43, respectively, at a uniform pressure. The gas is then processed in separate volumes and at separate pressures by the back pressure controller 35, downstream controller 39 and flow controller 43 and is exhausted from these controllers through a back pressure gas outlet line 37, downstream gas outlet line 41 and a flow gas outlet line 45, respectively, to a selector relay 47, for determining which stream of gas will be introduced into the gas pressure multiplier 60. Accordingly, the selector relay 47 is fitted with a back pressure controller relay port 48, a downstream controller relay port 49 and a flow controller relay port 50, which respectively receive the gas streams from the back pressure controller 35, downstream controller 39 and flow controller 43. These three streams are introduced into the selector relay 47 through the back pressure gas outlet line 37, the downstream gas outlet line 41 and the flow controller outlet line 45, as heretofore described. The gas flowing from the back pressure controller 35 through the back pressure gas outer line 37 is directed into the back pressure controller relay port 48 of the selector relay, as illustrated in FIG. 3. Gas flowing from the downstream controller 39 through the downstream gas outer line 41 flows into the downstream controller relay port 49, which is oppositely disposed with respect to the back pressure controller relay port 48 and communicates with a vertical ball check chamber 51, along with the back pressure controller relay port 48. A vertical ball check ball 52 is provided in the vertical ball check chamber 51 and seats to close either the back pressure controller relay port 48 or the downstream controller relay port 49, depending upon the relative magnitude of the pressure of the gas streams flowing through the back pressure gas outlet line 37 and the downstream gas outlet line 41, respectively. Similarly, gas flowing from the flow controller 43 through the flow gas outer line 45 is directed into a flow controller relay port 50, provided with a horizontal ball check chamber 54, which encloses a horizontal ball check ball 55. A central port 56 connects the vertical ball check chamber 51 to the horizontal ball check chamber 54, as further illustrated in FIG. 3. Accordingly, the highest pressure feed from the back pressure gas outlet line 37, downstream gas outlet line 41 and the flow gas outlet line 45 causes the respective vertical ball check ball 52 and horizontal ball check ball 55 to shift and facilitates the highest pressure gas flow from the selector relay exhaust port 57 into the selector relay exhaust port line 58. Gas at this pressure is therefore routed through the selector relay exhaust port line 58 into the multiplier inlet port 61 for disposition and 3:1 multiplication in pressure as heretofore described with regard to operation of the gas pressure multiplier 60 with a single controller.

It will be appreciated by those skilled in the art that the exhaust reduction system of this invention can be utilized for various gases such as natural gas, carbon dioxide oxygen, nitrogen, hydrocarbons of various description including butane, propane and the like, as well as acetylene, in non-exclusive particular. However, the system is primarily designed to control the emission of natural gas, or methane, and as such, the various component parts, including the system high pressure regulator, system low pressure regulator, selector relay and gas pressure multiplier are water, oil or gas (WOG) rated. Similarly, the conventional control elements including the line pressure regulator, back pressure controller, downstream controller and the flow controller are similarly WOG rated. Furthermore, the system is flexible, in that it can be installed on any flow control apparatus, whether the apparatus utilizes a single or three flow controllers for operating the control valve. The exhaust reduction system facilitates the use of flow volumes of natural gas at selected and regulated low pressures to operate the control valve and thereby greatly minimizes the loss of hydrocarbons to the atmosphere as the control valve is operated.

It will be appreciated from consideration of FIG. 1 of the drawing that the respective system high pressure regulator 11, system low pressure regulator 26, selector relay 47 and gas pressure multiplier 60 can be operated as independent units rather than enclosed in a common system housing 9. However, in a most preferred embodiment of the invention, these components are packaged in a system housing 9 for convenience in transportation, installation and operation.

It will be further appreciated by those skilled in the art that the gas pressure multiplier 60 can be selected to match the particular control valve 6 utilized to regulate the flow of natural gas or other gas through the pipeline 5. For example, under circumstances where the control valve 6 operates in a range from about three pounds to about fifteen pounds per square inch, the gas pressure multiplier 60 having a 1:3 ratio is ideal, since the device is capable of supplying gas at a pressure from three to fifteen pounds per square inch resulting from inlet pressure ranging from one to five pounds per square inch.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An exhaust reduction system for operating a gas pipeline control valve having a control device in fluid communication with the control valve and a line pressure regulator in fluid communication with the control device and the pipeline for receiving a control sample of the gas from the pipeline, reducing the pressure of the control sample and regulating the flow of gas through the pipeline, said exhaust reduction system comprising first pressure regulator means provided in fluid communication with the line pressure regulator for receiving the control sample of the gas from the line pressure regulator and further reducing the pressure of the control sample; second pressure regulator means provided in fluid communication with said first pressure regulator means and the control device for receiving a first stream of the control sample from said first pressure regulator means, responsive to operation of said first pressure regulator means and still further reducing the pressure of said first stream of the control sample and then diverting said first stream of the control sample to the control device, responsive to operation of said second pressure regulator means; pressure multiplier means provided in fluid communication with said first pressure regulator means and the control device for simultaneously receiving said first stream of the control sample from the control device, responsive to operation of said second pressure regulator means and receiving a second stream of the control sample from said first pressure regulator means, responsive to operation of said first pressure regulator means, whereby the pressure of said second stream of the control sample is increased in said pressure multiplier means to a selected multiple of the pressure of said first stream of the control sample and said second stream of the control sample is then directed from said pressure multiplier means to the control valve for operating the control valve.

2. The exhaust reduction system of claim 1 wherein the control device includes at least two control devices, each of the control devices receiving a portion of said first stream of the control sample from said second pressure regulator means and comprising selector relay means provided in fluid communication with the control devices for receiving said portion of said first stream of the control sample from each of the control devices and selecting said portion of said first stream of the control sample which is subjected to the highest pressure for introduction into said pressure multiplier means.

3. The exhaust reduction system of claim 1 wherein said pressure multiplier means comprises a 1:3 ratio pressure multiplier means, whereby the pressure of said second stream is three times as great is the pressure of said first stream of the control sample.

4. The exhaust reduction system of claim 3 wherein the control device includes at least two control devices, each of the control devices receiving a portion of said first stream of the control sample from said second pressure regulator means and comprising selector relay means provided in fluid communication with the control devices for receiving said portion of said first stream of the control sample from each of the control devices and selecting said portion of said first stream of the control sample which is subjected to the highest pressure, for introduction into said pressure multiplier means.

5. The exhaust reduction system of claim 1 wherein the control device includes a back pressure controller, a downstream controller and a flow controller, with each of the back pressure controller, downstream controller and flow controller receiving a portion of said first stream of the control sample from said second pressure regulator means and comprising selector relay means provided in fluid communication with the control devices for receiving said portion of said first stream of the control sample from each of the control devices and selecting said portion of said first stream of the control sample which is subjected to the highest pressure, for introduction into said pressure multiplier means.

6. The exhaust reduction system of claim 5 wherein said pressure multiplier means comprises a 1:3 ratio pressure multiplier means, whereby the pressure of said second stream of the control stream is three times as great as the pressure of said portion of said first stream of the control sample which is subjected to the highest pressure.

7. An exhaust reduction system for operating a control valve having at least two control devices in fluid communication with the control valve and a line pressure regulator in fluid communication with the control devices for regulating the flow of a gas through a pipeline, wherein the line pressure regulator receives a control sample of the gas from the pipeline and reduces the pressure of the control sample, said exhaust reduction system comprising first adjustable pressure regulator means provided in fluid communication with the line pressure regulator for receiving the control sample of the gas from the line pressure regulator and further reducing the pressure of the control sample; second adjustable pressure regulator means provided in fluid communication with said first adjustable pressure regulator means and the control devices for receiving a first stream of the control sample from said first adjustable pressure regulator means, responsive to operation of said first adjustable pressure regulator means and further reducing the pressure of said first stream of the control sample and then diverting respective portions of said first stream of the control sample to the respective control devices, responsive to operation of said second adjustable pressure regulator means; selector relay means provided in fluid communication with the control devices for receiving said respective portions of said first stream of the control sample from the respective control devices and selecting the one of said respective portions of said first stream of the control sample having the highest pressure, responsive to operation of said second adjustable pressure regulator means; pressure multiplier means provided in gas communication with said first adjustable pressure regulator means, said selector relay means and the control valve for simultaneously receiving said the one of said respective portions of said first stream of the control sample having the highest pressure from said selector relay means responsive to operation of said second adjustable pressure regulator means and receiving a second stream of the control sample from said first adjustable pressure regulator means, responsive to operation of said first adjustable pressure regulator means, whereby the pressure of said second stream of the control sample is increased to a selected multiple of the pressure of said the one of said respective portions of said first stream of control sample having the highest pressure and said second stream is directed from said pressure multiplier means to the control valve for operating the control valve.

8. The exhaust reduction system of claim 7 wherein said pressure multiplier means comprises a 1:3 ratio gas pressure multiplier, whereby the pressure of said second stream is about three times as great as the pressure of said the one of said respective portions of said first stream of the control sample having the highest pressure.

9. The exhaust reduction system of claim 8 wherein the control devices include a back pressure controller and a downstream controller.

10. The exhaust reduction system of claim 8 wherein the control devices include a back pressure controller and a flow controller.

11. The exhaust reduction system of claim 8 wherein the control devices include a downstream controller and a flow controller.

12. The exhaust reduction system of claim 8 wherein the control devices include a back pressure controller, a downstream controller and a flow controller.

13. A method of reducing the pressure of a control sample of a gas from a line pressure regulator and controlling a control valve having at least one controller for regulating the flow of gas in a pipeline, wherein the line pressure regulator is in fluid communication with the pipeline for receiving the control sample of gas from the pipeline, said method comprising the steps of:

(a) providing a first adjustable pressure regulator in gas communication with the line pressure regulator for receiving the control sample of gas from the line pressure regulator and reducing the pressure of the control sample of gas;

(b) providing a second adjustable pressure regulator in gas communication with said first adjustable pressure regulator and the controller for receiving a first stream of the control sample of gas from said first adjustable pressure regulator, responsive to operation of said first adjustable pressure regulator and reducing the pressure of said first stream of the control sample of gas, responsive to operation of said second adjustable pressure regulator;

(c) directing said first stream of the control sample of gas from said second adjustable pressure regulator to the controller, responsive to operation of said second adjustable pressure regulator;

(d) providing a gas pressure multiplier in gas communication with the controller and said first adjustable pressure regulator and directing said first stream of the control sample of gas from the controller into said gas pressure multiplier, responsive to operation of said second adjustable pressure regulator;

(e) introducing a second stream of the control sample of gas from said first adjustable pressure regulator into said gas pressure multiplier, increasing the pressure of said second stream of the control sample of gas in a selected ratio with respect to the pressure of said first stream of the control sample of gas and introducing said second stream of the control sample of gas into the control valve from said gas pressure multiplier for controlling the control valve, responsive to operation of said first adjustable pressure regulator.

14. The method according to claim 13 wherein the controller includes at least two controllers and comprising the steps of providing a selector relay in gas communication with the controllers and said gas pressure multiplier; directing respective portions of said first stream of the control sample of gas from said second adjustable pressure regulator to the respective controllers, responsive to operation of said second adjustable pressure regulator; introducing said respective portions of said first stream of the control sample of gas from the respective controllers into said selector relay, selecting the one of said respective portions of said first stream of the control sample of gas having the highest pressure and introducing said the one of said respective portions of said first stream of the control sample of gas having the highest pressure into said gas pressure multiplier, responsive to operation of said second adjustable pressure regulator.

15. The method according to claim 14 wherein the controllers are a back pressure controller, a downstream controller and a flow controller.

16. The method according to claim 14 wherein the controllers are a back pressure controller and a flow controller.

17. The method according to claim 14 wherein the controllers are a downstream controller and a flow controller.

18. The method according to claim 14 wherein the controllers are a back pressure controller and a downstream controller.

* * * * *